Figure 1:
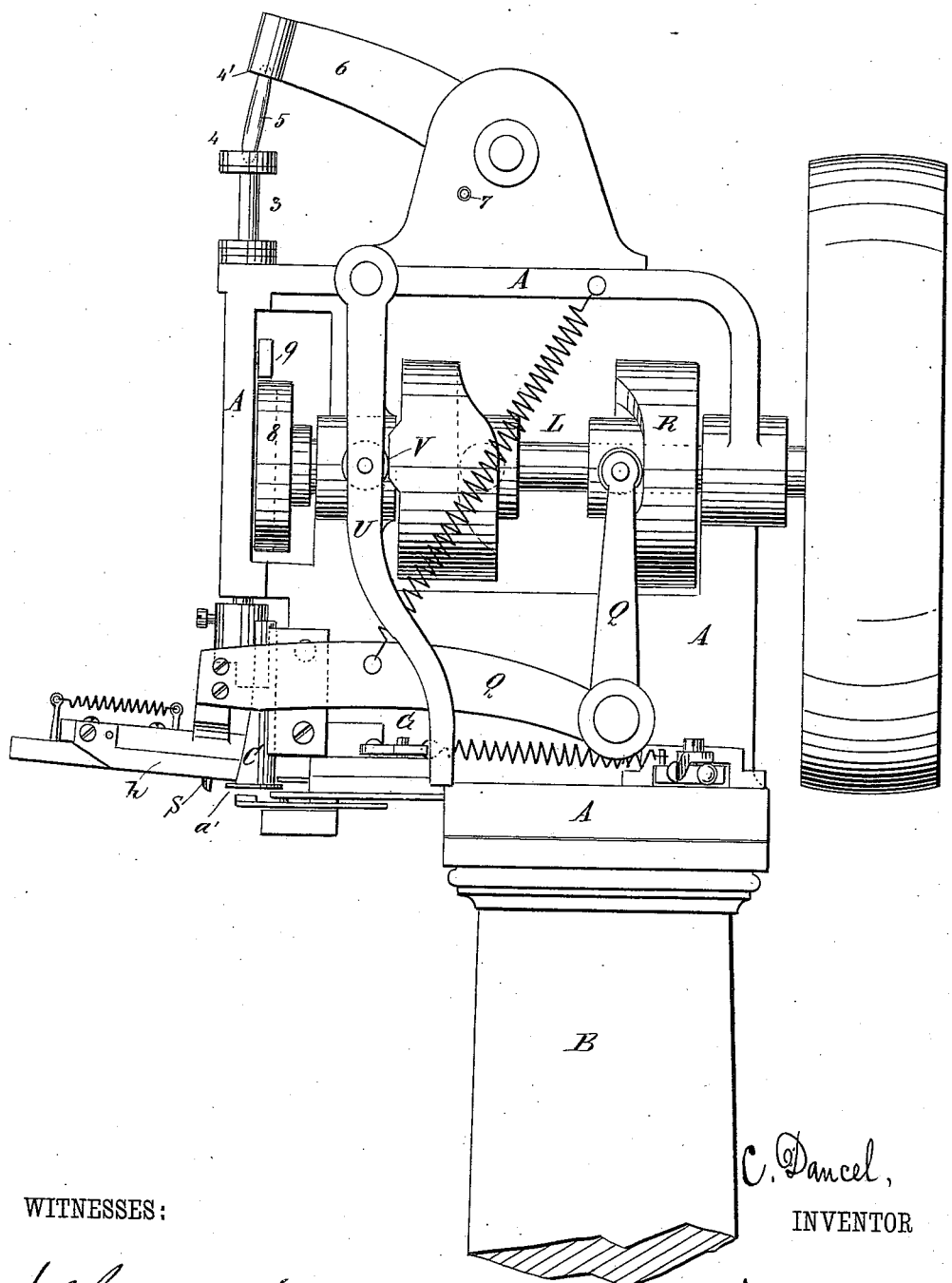

(No Model.) 5 Sheets—Sheet 1.

C. DANCEL.
MACHINE FOR LASTING BOOTS AND SHOES.

No. 312,335. Patented Feb. 17, 1885.

WITNESSES:

C. Dancel,
INVENTOR

BY J. C. Clayton,
ATTORNEY.

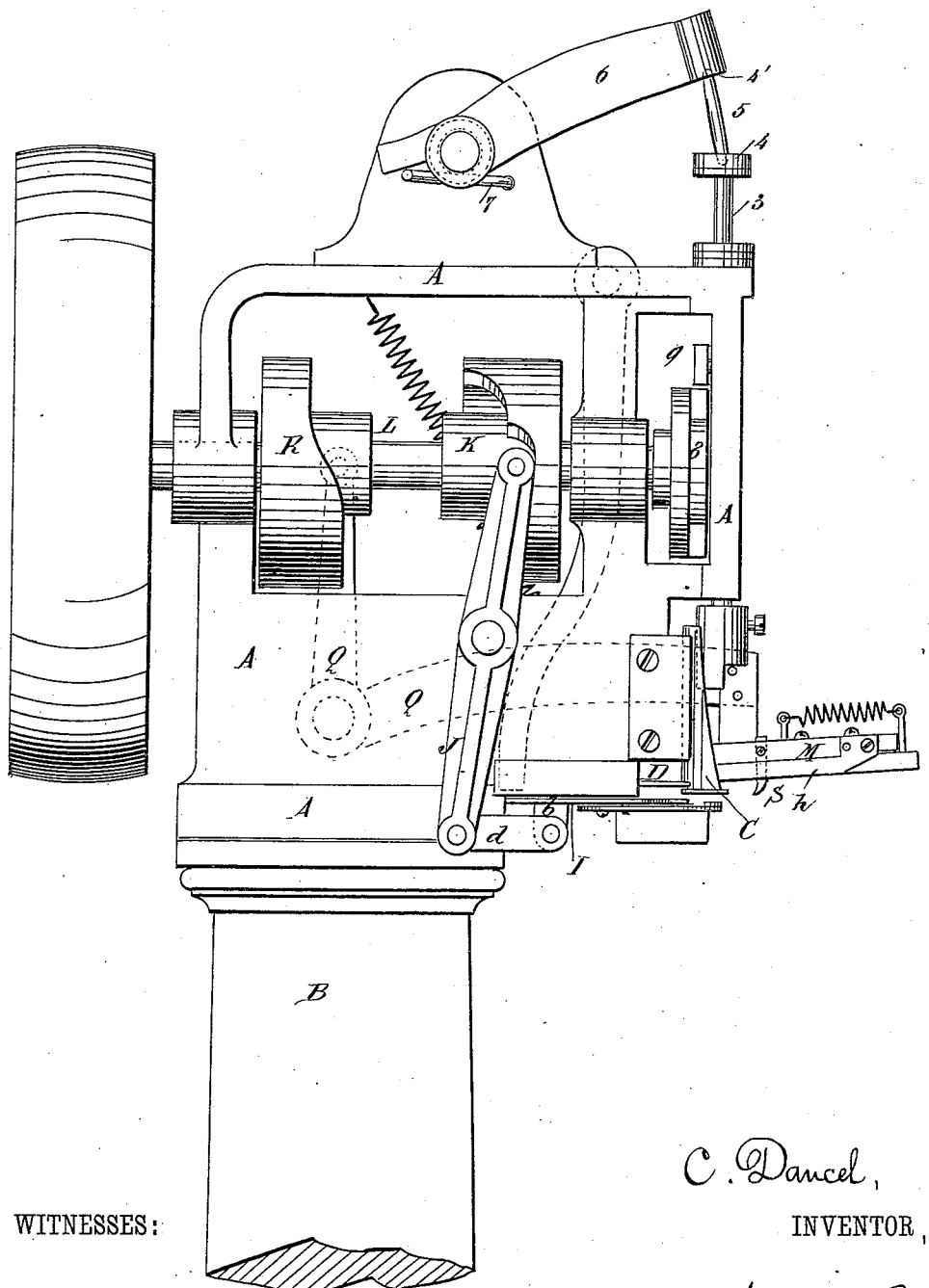

(No Model.) C. DANCEL. 5 Sheets—Sheet 3.
MACHINE FOR LASTING BOOTS AND SHOES.
No. 312,335. Patented Feb. 17, 1885.
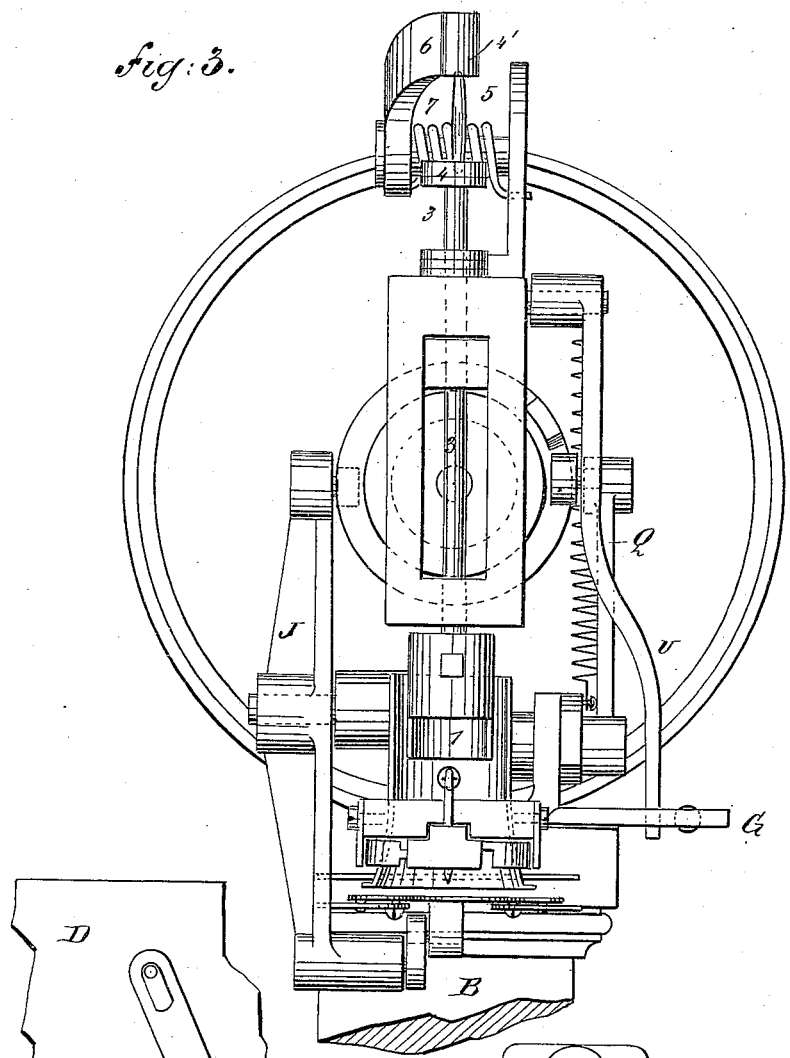
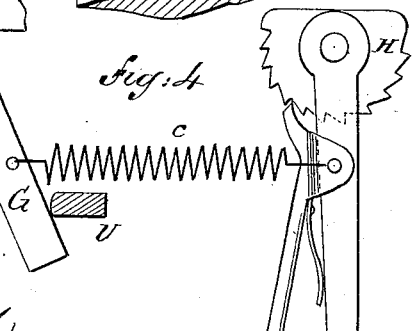
WITNESSES:
C. Dancel,
INVENTOR
BY J. C. Clayton,
ATTORNEY (No Model.) 5 Sheets—Sheet 4.

C. DANCEL.
MACHINE FOR LASTING BOOTS AND SHOES.

No. 312,335. Patented Feb. 17, 1885.

WITNESSES:
Jno. Cavanagh
Samuel Weil

INVENTOR,
C. Dancel,
BY J. C. Clayton,
ATTORNEY.

N. PETERS, Photo-Lithographer, Washington, D. C.

(No Model.) 5 Sheets—Sheet 5.

C. DANCEL.
MACHINE FOR LASTING BOOTS AND SHOES.

No. 312,335. Patented Feb. 17, 1885.

WITNESSES:
Jas. Cavanagh
Samuel Mill

INVENTOR
C. Dancel,
BY J. C. Clayton,
ATTORNEY.

UNITED STATES PATENT OFFICE.

CHRISTIAN DANCEL, OF NEW YORK, N. Y., ASSIGNOR TO JAMES CAVANAGH, TRUSTEE OF THE SCOTT LASTER ASSOCIATION, OF NEW YORK.

MACHINE FOR LASTING BOOTS OR SHOES.

SPECIFICATION forming part of Letters Patent No. 312,335, dated February 17, 1885.

Application filed November 10, 1884. (No model.)

*To all whom it may concern:*

Be it known that I, CHRISTIAN DANCEL, a citizen of the United States, and a resident of New York city, in the county of New York and State of New York, have invented certain new and useful Improvements in Machines for Lasting Boots or Shoes, of which the following is a specification.

My invention is particularly adapted to crimp and pull over the toe of the upper and tack it to the insole, and thus last the toe of a boot or shoe automatically, the operator merely placing the last within the upper, and the upper within the grip of the machine.

The machine, as described, is arranged to drive a single curved tack-strip around the curve of the toe; but it is obvious that any other suitable device for supplying and driving tacks may be used in connection with those parts of the machine which perform the most important functions of gripping, crimping, and pulling over the toe of the upper preparatory to lasting the sides and heels, either by hand or by the use of the Scott lasting-machine, patented in the year 1883.

My machine does about three-fourths of the work required in lasting a shoe and with great rapidity. The residue of the work may be done by hand; but it is better to use the Scott laster, patented by Jacob R. Scott in the United States in the year 1883, No. 284,906, to follow and finish right after this machine has lasted the toe.

In the drawings similar characters refer to like parts.

Figure 5:
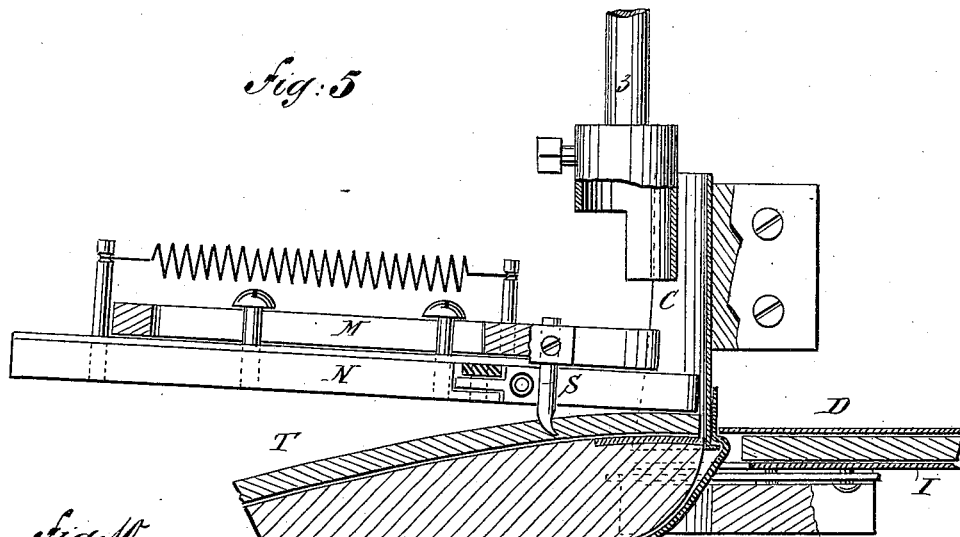
Figure 10:
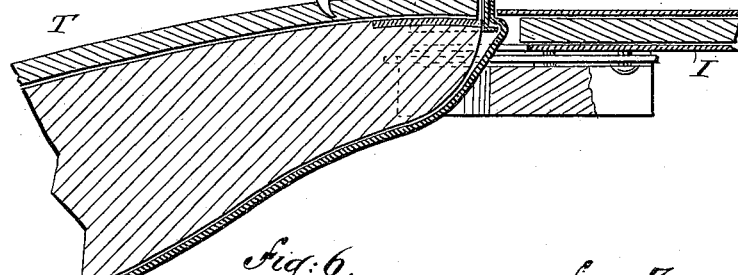
Figure 6:
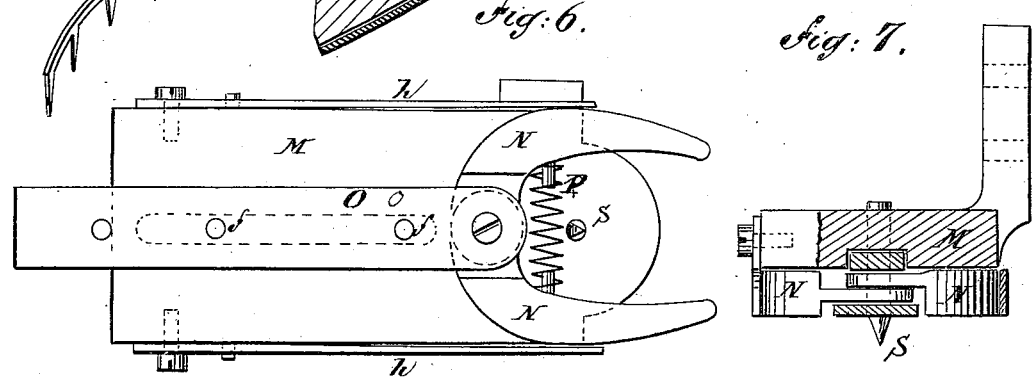
Figure 7:
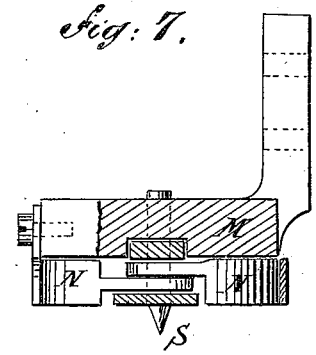
Figure 8:
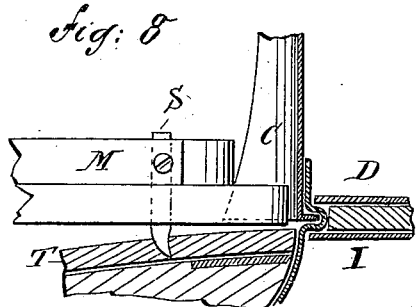
Figure 11:
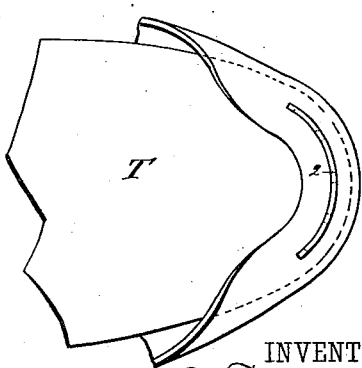
Figure 9:
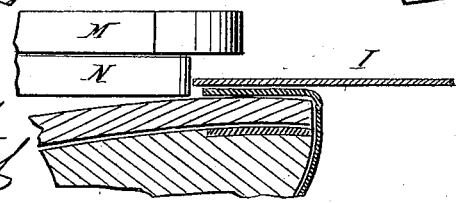
Figure 12:
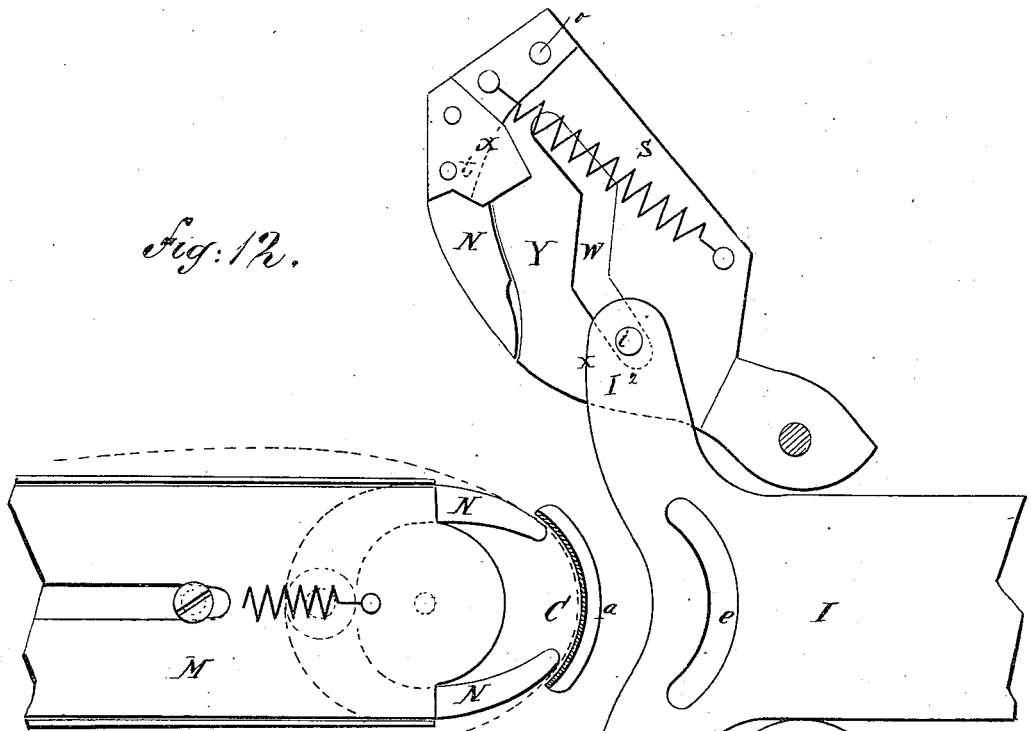
Figure 13:
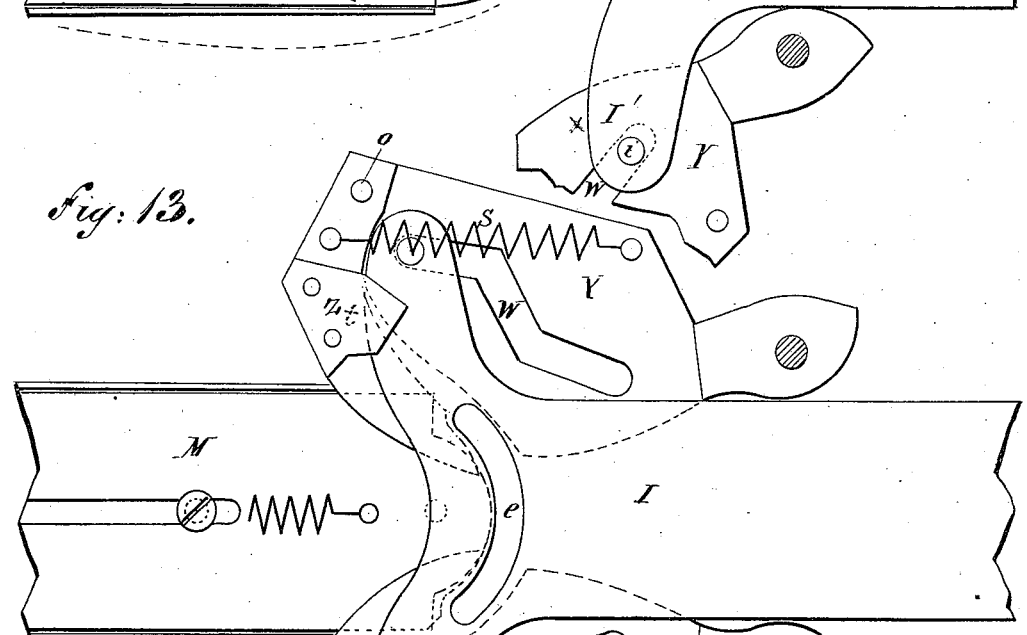

Figure 1 is a right-side elevation. Fig. 2 is a left-side elevation. Fig. 3 is a front elevation. Fig. 4 is a detail showing ratchet arrangement for regulating tension of gripping device. Fig. 5 is a working-size detail, showing a last with insole and upper applied to the machine, with the spear in the insole and the upper seized by the gripping and crimping device. Fig. 6 is a detail, working size, showing the under side of the pivoted jaws, which rest upon the insole on the last, and force the last downward. Fig. 7 is a cross-section of the same. Fig. 8 is a detail showing the movement of parts next after that shown in Fig. 5. Fig. 9 is a detail showing the upper laid over the last. Fig. 10 shows one of the forms of nail to be used—a curved strip with five points. Fig. 11 shows the toe lasted and tacked. Fig. 12 is a detail plan view of the working parts which push over the toe of the upper and press over the sides of the upper near the toe in the position when the upper is first gripped. Fig. 13 is a similar view when the crimping and pulling over of the upper has been completed and the machine is in position to drive the tack.

In the drawings, A represents the cast head or frame carrying the working parts.

B is the pillar or standard.

C is the crimper, which is of a curve nearly corresponding to the curve of the toe, and is provided with a lip, $a$, at its lower end. This crimper C is vertical and fast to the frame, and serves to determine the character and degree of the crimping.

D is the gripper or presser plate, which is a bar having at its outer end a curve corresponding to the curve of crimper C, and by proper mechanism, hereinafter described, is forced up against the upper, so as to grip the upper up against the crimper. (See Figs. 5 and 8.) The crimper is stationary; but the gripper or presser D is provided with a spring, $c$, to force it against the upper and hold it against the crimper C. It also has a hand-lever, G, pivoted on frame A, by which it is removed from the crimper, so as to insert the toe of the upper between G and C; also, it has a ratchet, H, and hand-lever, by which the tension of spring $c$ may be adjusted according to the stock used, grained leather requiring less than kid, and split and buff leather requiring less than either kid or grained.

I is the pusher, which is a plate the forward end of which is curved to correspond to the toe of the last, and is so timed in its movement that, when the grip is completed by the seizure of the upper between crimper C and gripper D, it is moved forward to the position shown in Fig. 8, thus forming a bend in the upper over the lip $a$ of crimper C, and thus presses the upper smoothly against the end of the last. This pusher I has a lug, $b$, on its under face, provided with a stud to receive the connecting-rod $d$, which is moved by pivoted lever J, operated by cam K on main shaft L.

The backward motion of pusher I is due to a spiral spring. (Not shown in the drawings.) The pusher I is provided with a curved slot, e, near its forward end, through which the tack and head of driver pass at the proper time, hereinafter described.

The machine having arrived at the position above referred to, (and which is shown in Fig. 8,) the mechanism for pressing the last downward is next operated. It may be described as follows: M is a heavy plate or casting carrying on its under surface the presser, composed of the hinged jaws N N, which are pivoted to a slide, O, whose slot works on pins $f$ in plate M. Spiral spring P forces these jaws N N apart, and flat springs $h$ force them toward each other. Plate M is suspended at the outer end of crank-lever Q, which is pivoted to the frame A. The upper end of lever Q has a stud worked by cam R on the main shaft. As crank-lever Q is moved by its cam its outer end is forced downward, carrying with it plate M and presser-jaws N N. S is a spear projecting downward from plate M between jaws N N, and is adapted to enter the insole, (see Fig. 8,) and may also be made long enough to pass through the insole and enter a hole in the last made to receive it. It is also often desirable to make a hole in the insole T to receive the spear and guide the operator in applying the last, insole, and upper to the action of the machine. The object of the spear is to hold the last and insole against the action of the pusher I. Downward motion being given to presser-jaws N N, as above described, they rest upon the insole on the last and force downward the last and insole to the position shown in Fig. 9. When this position of jaws N N is reached, the pusher I continues its forward motion and takes the position shown in Fig. 9. As the pusher I makes this movement and before it is completed, the presser or gripper D is moved back from the crimper C by the cam-lever U, which presses against hand-lever G, and is operated by cam V. This backward movement of the gripper D releases the upper and permits the pusher I to lay the upper over the insole, as shown in Fig. 9. At the instant when the pusher I begins its forward movement just described the device for pushing over the sides of the upper near the toe begins its work, as follows: Pusher I is provided with arms I' I², having studs $i$ $i$, working in cam-slots $w$ $w$ in the side-pushers Y Y, which are pivoted to the frame A. (See Figs. 12 and 13.) As the pusher I goes forward its studs $i$ $i$, working in cam-slots $w$ $w$, draw the side-pushers Y Y toward each other, and thus they are made to push the sides of the upper near the toe over the insole. Attached to each side-pusher Y is a wing, Z, pivoted at $o$ and held in place by spring $s$. As the pusher I approaches the end of its forward movement, that part of its arms marked $x$ strikes against the shoulder $t$ on wing Z, and thus opens the wing from the pusher Y so as to leave space for passage of tack and driver. This opening movement begins after the wings Z have performed their function of laying the sides of upper over insole, as shown in Figs. 12 and 13.

The jaws N N are intended to rest upon and hold down the edges of the insole snug against the last until the pushers Y have reached the point when they begin to lay the upper over the insole. As these pushers do this they come against jaws N N and force them out of their way, so that the laying over may be completed. At the same time pusher I, resting against the upper, presses the upper against the end of jaws N N and pushes them forward out of the way.

The device for tacking shown in this drawing may thus be described: 1 is the driver-head, of a curved shape, to correspond to the curve of the toe of the shoe. This driver-head is to be magnetized, so that the tack-strip 2 may be suspended magnetically from its under face, points downward. 3 is the driver-shaft, extending upward through the frame and having a cup, 4, on its upper end. 5 is a rod, the lower end of which rests in cup 4 while the upper end rests in a similar cup, 4', in the head of driver-lever 6, which is operated by torsion-spring 7. The driver is raised by cam 8, operating against lug 9 on the driver-shaft 3. The upper having been crimped and laid over, as above described, (and a tack-strip having been previously applied to the face of the driver,) as the cam 8 moves it raises the driver and suddenly releases it, whereupon the action of spring 7 causes the driver to rapidly fall and deliver a smart blow to the tack-strip, thus driving it through the upper and into the insole around the toe, as shown in Fig. 11.

I do not confine myself to a magnetized driver or to a tack-strip, for the crimping and pulling-over portions of my machine may be used with any suitable tack or any suitable mechanism for feeding or for driving tacks.

The grip of the upper in my machine is made by the combined action of crimper C, lip $a$, and presser D, and this grip is chiefly effected by the bend of the upper over the lip $a$. It will be noticed that this lip (see Fig. 5) in taking its grip is placed at a point below the level of the last, and as the last is forced downward, carrying with it the upper, the said lip has a scraping or smoothing out action on the under surface of the upper, and smooths out the wrinkles as the upper is drawn down over the edge of said lip, thus securing a smoother and more perfect crimping of the toe than can be obtained by hand-lasting.

Although the best results can be obtained in most cases by having crimper C provided with the lip $a$, yet in some cases the lip may be omitted.

Instead of forcing the last and upper downward from the crimper, as shown, the reverse operation may easily be made, and the last may be stationary, and the crimper may be forced upward away from the last; but this is a mere reversal of the operation described, not involving invention.

In operating my machine the operator inserts the last into the upper. He then presses on hand-lever G, and thus pushes back presser D from crimper C, and then inserts the toe of the upper straight and smooth between presser D and crimper C and releases hand-lever G. The spring c of this lever then forces presser D against the upper, holding it with a sufficient pressure against the crimper C. It will be seen that the grip of the upper between the crimper and presser is a curved grip looking at it vertically, and a straight grip looking at it horizontally. At the same time spear S is inserted into a hole pricked for it at the proper point in the insole. This spear is described and claimed in one of the Jacob R. Scott patents heretofore referred to, and serves to give resistance to the thrust of the pushing and laying-over devices. The upper being thus gripped and the spear inserted, motion by hand, or preferably by steam, is given to the main shaft. Cam K then, by means of lever J, connecting-rod d, and lug b, moves pusher I forward against the upper, thus bending the upper over the lip, as shown in Fig. 8. The pusher I having reached this position, the last and insole are forced downward by plate M and jaws N N, which are actuated by main shaft L, cam R, and lever Q and their connections, as heretofore described, giving to the last the position shown in Fig. 9. As this position is reached, pusher I continues its forward motion and pushes the toe of the upper over the insole, as in Fig. 9. While this is doing, presser D is moved backward so as to release its grip by action of cam-lever U upon hand-lever G. As pusher I moves forward the side-pushers Y Y and wings Z Z are made (as heretofore described) to push over the sides of the upper near the toe. The toe having been crimped and laid over the insole at the toe, and for about half an inch of the side, and the wing Z having been opened, as described, and a tack-strip having been previously applied to the driver-head, the cam 8 on main shaft raises the driver-head, and the torsion-spring forces it down with a quick blow, driving the tack-strip through the crimped and laid-over toe and sides into the insole, as is shown in Fig. 11. The tacks having been driven, the last and shoe on it can then be laid to one side, or be handed to the operator, who can then finish the lasting from the portion lasted on my machine.

As only one turn of my main shaft is required to perform a complete operation of my machine, and as skilled labor is not required, it is manifest that a very high degree of speed can be obtained.

Having fully described my invention, what I claim as new is as follows:

1. In a lasting-machine, the curved crimper C, in combination with means, substantially as described, for operating the same, substantially as set forth.

2. In a lasting-machine, the curved crimper C, in combination with presser D and suitable operating means, substantially as set forth.

3. In a lasting-machine, curved crimper C, in combination with plate M, jaws N N, and suitable operating means to force said plate M downward and said jaws downward and inward, substantially as set forth.

4. In a lasting-machine, the downward presser composed of plate M and jaws N N, and suitable actuating means, substantially as set forth.

5. In a lasting-machine, the spear S, in combination with a presser composed of plate M and jaws N N, operating substantially as set forth.

6. In a lasting-machine, the pusher-plate I, in combination with crimper C, and suitable actuating means, substantially as set forth.

7. In a lasting-machine, the pusher-plate I, in combination with presser-jaws N N and suitable actuating means, substantially as set forth.

8. In a lasting-machine, the presser-jaws N N, in combination with their actuating means, substantially as set forth.

9. In a lasting-machine, the curved presser D, in combination with cam-lever G and its operating means for releasing the grip on the upper, substantially as set forth.

10. In a lasting-machine, the combination of side-pushers Y Y, pusher I, and their operating means, substantially as set forth.

11. In a lasting-machine, the side-pushers Y Y, provided with side wings, Z Z, as arranged, and provided with operating means, substantially as set forth.

12. In a lasting-machine, presser D and pusher I, in combination with crimper C and their actuating means, substantially as set forth.

13. In a lasting-machine, the combination of crimper C, presser D, pusher I, plate M, jaws N N, and side-pushers Y Y, provided with wings Z Z, substantially as set forth.

Signed, at New York, in the county of New York and State of New York, this 7th day of November, A. D. 1884.

CHRISTIAN DANCEL.

Witnesses:
JAS. CAVANAGH,
J. C. CLAYTON.